(12) United States Patent
Schlosser

(10) Patent No.: US 9,372,124 B2
(45) Date of Patent: Jun. 21, 2016

(54) APPARATUS INCLUDING STRAIN GAUGES FOR ESTIMATING DOWNHOLE STRING PARAMETERS

(75) Inventor: Timm Schlosser, Celle (DE)

(73) Assignee: BAKER HUGHES INCORPORATED, Houston, TX (US)

( * ) Notice: Subject to any disclaimer, the term of this patent is extended or adjusted under 35 U.S.C. 154(b) by 848 days.

(21) Appl. No.: 13/355,052

(22) Filed: Jan. 20, 2012

(65) Prior Publication Data
US 2013/0186195 A1    Jul. 25, 2013

(51) Int. Cl.
*E21B 47/00* (2012.01)
*G01L 1/22* (2006.01)

(52) U.S. Cl.
CPC ........... *G01L 1/2287* (2013.01); *E21B 47/0006* (2013.01); *Y10T 29/49885* (2015.01)

(58) Field of Classification Search
CPC ....................................................... E21B 44/00
USPC ............... 73/152.43, 152.48, 152.49, 152.54, 73/152.59, 763, 767, 772, 774, 775, 799, 73/804, 805, 806, 808, 809, 152.46, 73/152.02, 152.03, 783, 784
See application file for complete search history.

(56) References Cited

U.S. PATENT DOCUMENTS

| | | | | |
|---|---|---|---|---|
| 4,267,727 A * | 5/1981 | Hoppe | ............... | E21B 47/0006 73/152.59 |
| 4,269,063 A * | 5/1981 | Escaron | ................... | G01L 1/22 73/152.59 |
| 4,958,517 A | 9/1990 | Maron | | |
| 6,269,702 B1 | 8/2001 | Lambson | | |
| 6,601,671 B1 * | 8/2003 | Zhao | ....................... | G01V 1/16 181/108 |
| 6,889,557 B2 * | 5/2005 | Richardson | .......... | G01N 27/205 73/809 |
| 7,832,277 B2 | 11/2010 | Skwara | | |
| 8,490,481 B2 * | 7/2013 | Arms | ....................... | G01B 7/16 73/431 |
| 2002/0070050 A1 * | 6/2002 | Wassell | ............... | E21B 47/0006 175/39 |
| 2003/0024322 A1 * | 2/2003 | Gilch | ....................... | G01B 7/18 73/768 |
| 2003/0183015 A1 * | 10/2003 | Richardson et al. | ............ | 73/772 |
| 2004/0063238 A1 * | 4/2004 | Nagasaka | ............ | G01L 9/0042 438/50 |
| 2004/0265410 A1 | 12/2004 | Hehl | | |
| 2006/0005965 A1 * | 1/2006 | Chouzenoux | ....... | E21B 47/0006 166/250.11 |
| 2007/0240519 A1 * | 10/2007 | Shimazu | .................. | G01B 7/18 73/777 |
| 2009/0013775 A1 * | 1/2009 | Bogath | ................... | E21B 17/16 73/152.49 |
| 2012/0111633 A1 * | 5/2012 | Kumar | ............... | E21B 47/0006 175/50 |
| 2012/0304783 A1 * | 12/2012 | Kitamura | .............. | B60B 27/023 73/862.49 |

FOREIGN PATENT DOCUMENTS

GB       2312047 A      10/1997

OTHER PUBLICATIONS

Blankenship, et al. "Development of a High-Temperature Diagnostics-While-Drilling Tool". Sandia Report, SAND2009-0248, Sandia National Laboratories, Jan. 2009. 58 pages.

(Continued)

*Primary Examiner* — Hezron E Williams
*Assistant Examiner* — Hoang Nguyen
(74) *Attorney, Agent, or Firm* — Cantor Colburn LLP

(57) ABSTRACT

An apparatus for measuring strain on a downhole carrier includes a strain sensitive chassis configured to be fixedly mounted on a surface of the carrier. The chassis configured to be subject to a strain corresponding to a strain on the carrier; and at least one strain gauge including at least one thin film conductor deposited on a surface of the chassis. Also included is a method of manufacturing a sensor for measuring strain on a downhole carrier.

18 Claims, 3 Drawing Sheets

(56) References Cited

OTHER PUBLICATIONS

Dennis, et al. "Quartz Technology Allows for Wider Downhole Pressure Testing Range" SPE Formation Evaluation, Mar. 1991, pp. 33-38.

Expro Services and Products.Jun. 2, 2009,URL:http://www.offshore-europe.co.uk/ExhibitorLibrary/75/Expro_services_and_products_3.pdf. pp. 1-25.

Kratz, et al. "Improved Geothermal Well Logging Tools Using No Downhole Electronics". U.S. Deptarment of Energy, Geothermal Energy, Jul. 31, 1979. 28 pages.

Kulha, et al. "Design and Fabrication of Piezoresistive Strain-Gauges for Harsh Enviroment Applications". Department of microelectronics, Czech Technical University. International Conference on Renewable Energies and Power Quality. Mar. 23-25, 2010. 4 pages.

Rui, et al. "Sputtered thin film technology in the underground Torque/WOB measurement applications". China Petroleum Machinery 2009, No. 37, No. 3. Translated. 17 pages.

Notification of Transmittal of the International Search Report and the Written Opinion of the International Searching Authority, or the Declaration; PCT/US2013/021645; Apr. 29, 2013.

* cited by examiner

APPARATUS INCLUDING STRAIN GAUGES FOR ESTIMATING DOWNHOLE STRING PARAMETERS

BACKGROUND

During drilling operations, sensors are often utilized to measure various forces exerted on a drill string. Exemplary forces include weight-on-bit and bending forces on various parts of the drill string. These forces can affect the dynamic behavior of the drill string, and if not monitored, can result in damage to downhole components or compromised operation. Such measurements provide information that can be used to, for example, measure drilling parameters or monitor downhole conditions.

For measurement of such forces, strain gauges can be utilized to measure strain at various locations of the drill string. Various conditions and considerations should be accounted for when configuring such strain gauges, such as temperature sensitivity of the gauges and any adhesives or other means used to mount the gauges, as well as ease of manufacture and installation of components that include the strain gauges.

SUMMARY

An apparatus for measuring strain on a downhole carrier includes: a strain sensitive chassis configured to be fixedly mounted on a surface of the carrier, the chassis configured to be subject to a strain corresponding to a strain on the carrier; and at least one strain gauge including at least one thin film conductor deposited on a surface of the chassis.

A strain sensing apparatus includes: a drill string configured to be disposed in a borehole in an earth formation; a strain sensitive chassis configured to be fixedly mounted on a surface of the drill string, the chassis being made from the same material as the drill string and configured to be subject to a strain corresponding to a strain on the carrier at a location of the chassis; and at least one strain gauge including at least one thin film conductor deposited on a surface of the chassis.

A method of manufacturing a sensor for measuring strain on a downhole carrier includes: depositing a thin film layer of an electrically insulating material onto a chassis, the chassis made from a material that is substantially the same as the carrier and configured to be subject to a strain corresponding to a strain on the carrier at a location of the chassis; depositing a thin film electrical conductor on the thin film insulating layer; and fixedly mounting the chassis on a surface of the carrier.

BRIEF DESCRIPTION OF THE DRAWINGS

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings, wherein like elements are numbered alike, in which:

DETAILED DESCRIPTION

Figure 1:
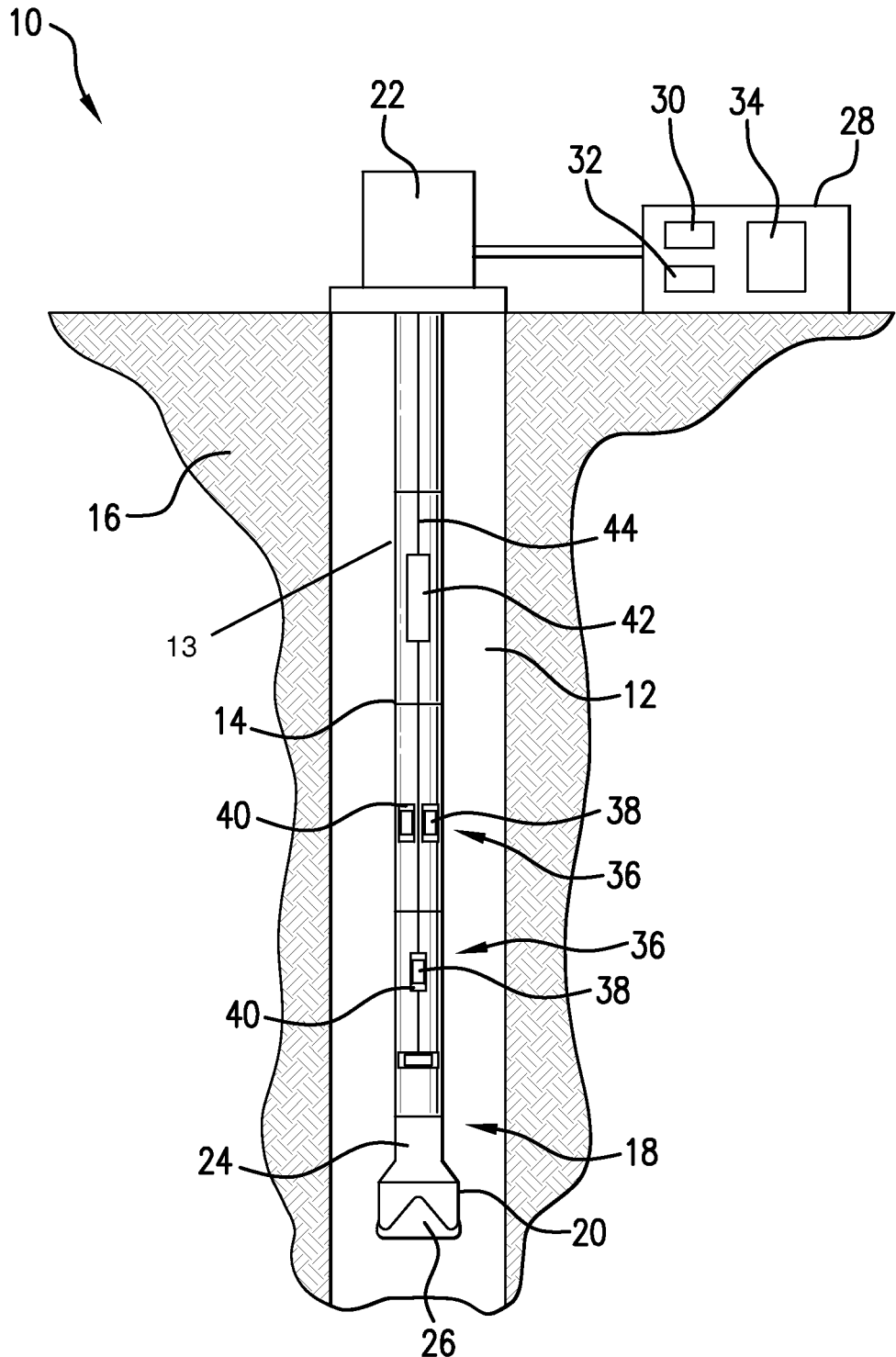
FIG. 1 is an exemplary embodiment of a drilling system including a drill string disposed in a borehole in an earth formation.

Referring to FIG. 1, an exemplary embodiment of a downhole drilling system 10 disposed in a borehole 12 is shown. A downhole carrier 13 including one or more downhole components, such as a drill string 14, is disposed in the borehole 12, which penetrates at least one earth formation 16. Although the borehole 12 is shown in FIG. 1 to be of constant diameter, the borehole is not so limited. For example, the borehole 12 may be of varying diameter and/or direction (e.g., azimuth and inclination). The drill string 14 is made from, for example, a pipe or multiple pipe sections. The system 10 and/or the drill string 14 include a drilling assembly 18. Various measurement tools may also be incorporated into the system 10 to affect measurement regimes such as wireline measurement applications or logging-while-drilling (LWD) applications.

The drilling assembly 18, which may be configured as a bottomhole assembly (BHA), includes a drill bit 20 that is attached to the bottom end of the drill string 14 via various drilling assembly components. The drilling assembly 18 is configured to be conveyed into the borehole 12 from a drilling rig 22. The drilling assembly also includes various components for structural and operational support to the drill bit 20, such as a drill bit body 24 operably connected to cutters 26, a drilling motor (also referred to as a mud motor), and a stabilizer or reamer.

A processing unit 28 is connected in operable communication with the drilling assembly 18 and may be located, for example, at a surface location, a subsea location and/or a surface location on a marine well platform or a marine craft. The processing unit 28 may also be incorporated with the drill string 14 or the drilling assembly 18, or otherwise disposed downhole as desired. The processing unit 28 may be configured to perform functions such as controlling the drilling assembly 18, transmitting and receiving data and monitoring the drilling assembly 18 and the drill string 14. The processing unit 28, in one embodiment, includes a processor 30, a data storage device (or a computer-readable medium) 32 for storing, data, models and/or computer programs or software 34.

The system 10 also includes one or more strain sensor assemblies 36 for measuring forces experienced by the drill string while downhole and/or in operation. Each sensor assembly 36 includes at least one strain gauge 38 mounted on a chassis 40. One or more strain gauges 36 are mounted on a respective chassis via a sputtering or thin film deposition technique. The chassis 40 is fixedly attached to or mounted on a surface of the drill string 14, and is configured to be subject to a strain corresponding to a strain on the drill string 14 and/or drilling assembly 18 at the location of the chassis 40. As described herein, a "chassis" refers to any support structure to which the strain gauge can be mounted on, and which in turn can be mounted on the drill string surface. The chassis, in one embodiment, is a solid piece of material (e.g., steel) that is made of the same material as the surface and experiences a strain corresponding to a strain on the drill string, e.g., the same or proportional strain as experienced at the string surface. For example, the material used to form the chassis has at least substantially the same or a similar coefficient of expansion as the drill string material. The coefficients of expansion need not be exactly the same, as the coefficient of expansion of the chassis material can be within a range of the string material coefficient such that, e.g., the string and the chassis experience at least substantially the same strain. The configuration of the chassis 40 is not limited, which may have any thickness or shape that can be used to mount the gauge and that transmits and/or amplifies the strain on the string.

The strain gauge 38 transmits signals to a processor in the form of, e.g., voltage changes, to a desired location. For example, the strain gauges 38 are coupled to a downhole electronics unit 42, which may receive signals from the strain gauges 38 and transmit the data to a processing system such as the processing unit 28. Signals and data may be transmitted via any suitable transmission device or system, such as a cable 44. Other techniques used to transmit signals and data include wired pipe, electric and/or fiber optic connections, mud pulse, electromagnetic and acoustic telemetry.

The processing unit 28 is configured to analyze and/or transmit data to a user or other location for analysis. Such analysis includes estimating downhole parameters such as weight-on-bit (WOB), torque-on-bit (TOB) and bending forces on portions of the drill string 14 or bending forces on the bit (BOB). Measurements of parameters such as torque and bending can also be used to estimate other parameters such as drill string direction or deviation, and unwanted deformation such as buckling. Although embodiments are described in conjunction with drill string and drilling operations, including logging-while-drilling (LWD) operations, they are not so limited. The apparatuses and methods described herein may be utilized with any component, including downhole components such as wireline tools, that experience strain.

Figure 2:
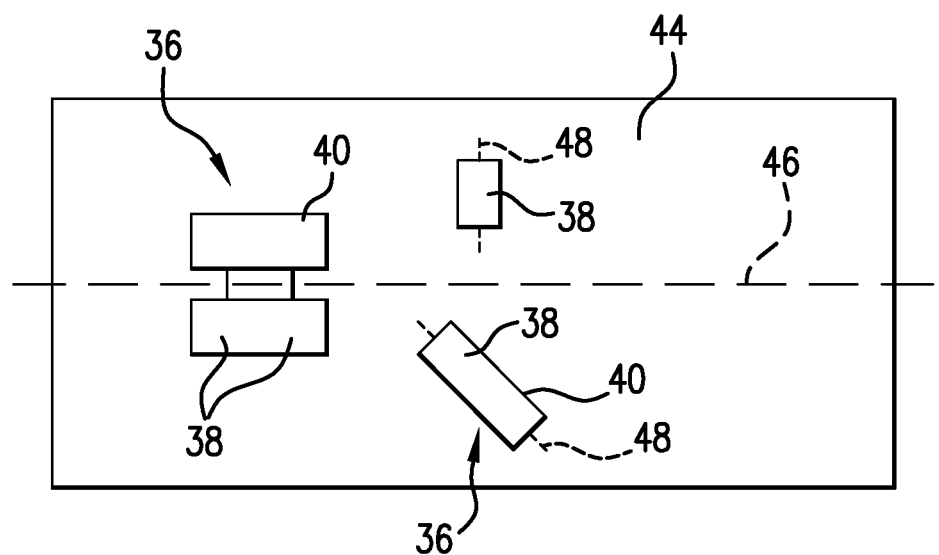
FIG. 2 is a perspective view of a portion of the drill string of FIG. 1 including one or more sensor assemblies.

Referring to FIG. 2, embodiments of the sensor assembly 36 include one or more strain gauge chassis 40 fixedly attached or mounted to a surface of 44 of the drill string 14. This may be any surface, including an interior or exterior of a drill pipe segment, the drill bit body 24 and others. The chassis 40 is mounted on the surface 44 by any suitable means, such as by adhesive, welding, brazing or mechanical securing such as bolting or screwing to the string.

As shown in FIG. 2, the measurement assembly 36 illustrates various configurations than can be utilized to measure strain on the drill string 14. The orientations of each strain gauge 38 are merely exemplary, as the strain gauge can be positioned or oriented in any suitable fashion as desired. In addition, the numbers of strain gauges 38, as well as the number of strain gauges 38 deposited on each chassis 40, is not limited.

In this example, the drill string 14 defines a central longitudinal axis 46, referred to as the "drill string axis" or "string axis". Each strain gauge also 38 defines a "strain gauge axis" or "gauge axis" 48 which corresponds to the direction of sensitivity of the conductors for which changes in resistance are measured. For the strain gauges of the type illustrated herein, the strain gauge axis 48 corresponds to the direction of the elongated conductors and also to the direction of greatest sensitivity. Examples of strain gauge configurations are shown in FIG. 2. For example, one or more gauges 38 are configured so that the gauge axis 48 is at least substantially parallel to the string axis 46, to measure axial forces that can be used to estimate parameters such as WOB. In another example, one or more gauges 38 are oriented so that the gauge axis 48 is at least substantially parallel to allow for estimation of, e.g., bending forces. In yet another example, one or more gauges 38 can be oriented at approximately 45 degrees relative to the string axis 46 to measure torsional strain, which can be used to estimate torque on parts of the string (e.g., TOB). It is noted that multiple assemblies and or strain gauges with different orientations can be operably connected, for example, as part of a single assembly or bridge circuit. In one embodiment, one or more of the strain gauges can be fixed so that the strain gauge axis is positioned along an ideal bending line of the string.

In one embodiment, one or more strain gauges 38 are electrically connected as part of a bridge circuit, such as a Wheatstone bridge. Examples of such circuits include a quarter bridge (including one gauge), a half bridge (including two gauges) and a full bridge (including four gauges). In the example shown in FIG. 2 half bridges can be formed on a single chassis 40, and can be electrically connected to form a full bridge. In other embodiments, a full bridge can be formed on a single chassis 40.

Figure 3:
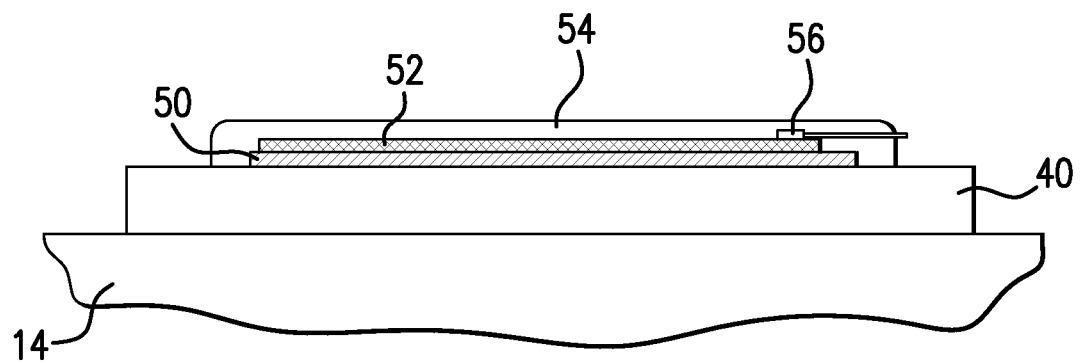
FIG. 3 is a side view of an exemplary sensor assembly of FIG. 2.

FIG. 3 illustrates component layers of an embodiment of the strain gauge 38. In this embodiment, the strain gauge 38 is a sputtered or thin film strain gauge. "Thin film" generally refers to one or more layers of a material having a thickness in the range of fractions of a nanometer to several micrometers. The strain gauges 38 can be formed by various deposition processes. An exemplary process is a sputtered thin film deposition technique, which includes depositing an insulating layer 50 on the chassis 40, depositing and/or etching a thin film conductor 52 on the insulating layer 50, and optionally depositing or otherwise covering the conductor 52 with a protective layer 54. The protective layer 54 may be, for example, a polymer or epoxy material, a metallic material, or any other suitable material configured to withstand temperatures found in a downhole environment. Gauge leads 56 are connected to the ends of the conductor. For example, the insulated layer 50 is sputtered onto the surface of the chassis 38, and the conductor 52 is formed by depositing a thin film of a resistive alloy or metal and etching (e.g., laser etching) the film into balanced resistors. Exemplary techniques for depositing the thin film conductor 52 and/or the insulating layer 50 include sputtering, evaporation, pulsed laser deposition, chemical vapor deposition and others.

In this embodiment, at least the insulating layer 50 and the conductor 52 are deposited as thin film layers. The insulating layer can be any suitable material, including dielectric materials such as plastics or ceramics. Exemplary insulating materials include polyimides and epoxies. Conductor 52 materials may be any suitable conductive materials, including conductive metals such as copper and copper alloys (e.g., Copel), platinum and platinum alloys, nickel, isoelastic alloys and others.

Figure 4:
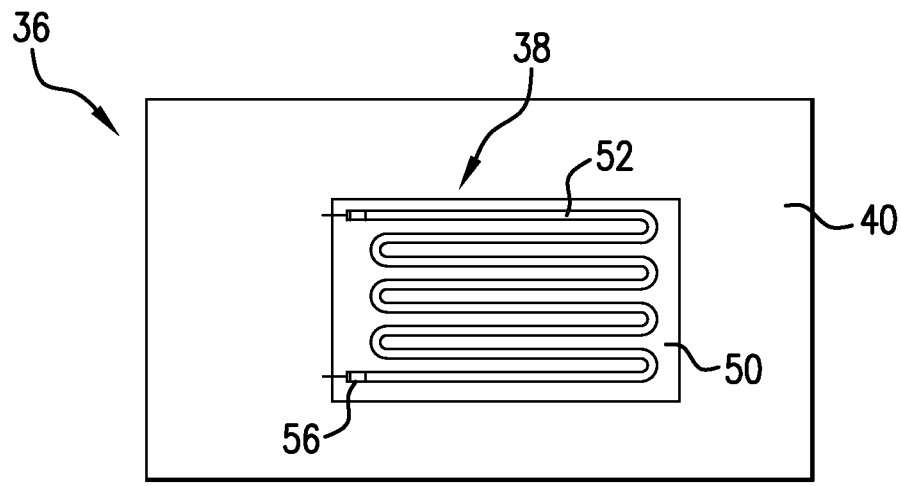
FIG. 4 is a top view of the sensor assembly of FIG. 4.

FIG. 4 illustrates an exemplary assembly 36 including a single strain gauge 38 deposited on a chassis 40. In this example, the chassis 40 has dimensions of approximately 20 mm in length, and between 1 and 10 mm in thickness. The strain gauge 38 is a thin film deposited foil strain gauge having dimensions of approximately 4 mm by 3 mm. These dimensions are purely exemplary and non-limiting. The chassis 40 can have any suitable area sufficient to support one or more strain gauges thereon. In one embodiment, the chassis area is minimized to have the smallest area needed to support the strain gauge 38 and required leads.

Figure 5:
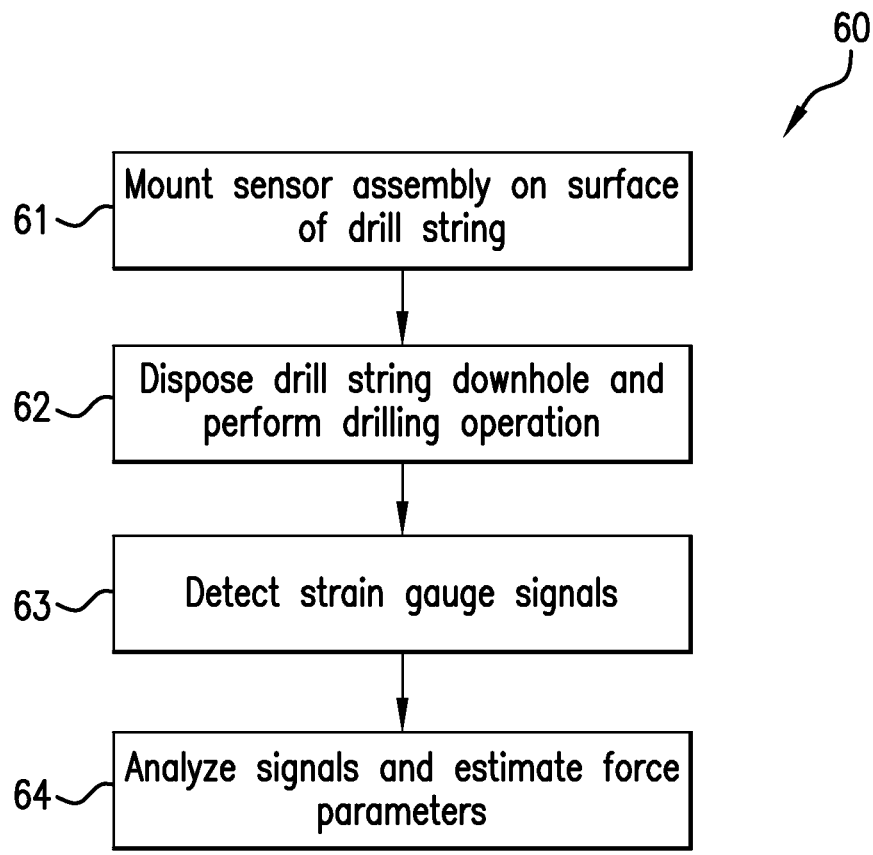
FIG. 5 is a flow chart illustrating an exemplary method for measuring downhole parameters.

Referring to FIG. 5, an exemplary method 60 for measuring downhole parameters is shown. The method 60 includes one or more stages 61-64. In one embodiment, the method 60 includes the execution of all of stages 61-64 in the order described. However, certain stages may be omitted, stages may be added, or the order of the stages changed.

In the first stage 61, one or more sensor assemblies 36 are mounted onto a surface of the drill string 14. Each assembly is mounted by, for example, welding, adhesion or mechanical means such as a threaded connection. The assembly 36 can be mounted directly on the surface and/or in a recess or other configuration formed on the drill string 14. In one embodiment, the assembly 36 is mounted with a protective component, such as a metal plate covering the assembly for protection from downhole conditions. Each assembly 36 is oriented as desired to measure a desired type of strain.

In the second stage 62, the string 14 and assembly or assemblies 36 are disposed downhole, e.g., during a drilling or LWD operation. The string 14 may be configured as any desired type, such as a measurement string or completion string.

In the third stage 63, strain on the string 14 is measured during a drilling or LWD operation (or other desired operation) by transmitting an electrical signal to the strain gauge 38 and measuring a change in resistance of the conductor 52. In one embodiment, the assembly 36 includes one or more strain gauges 38 connected as a Wheatstone bridge circuit. Transmission and detection can be performed by, for example, the electronics unit 42 and/or the processing unit 28.

In the fourth stage 64, the change in resistance (e.g., indicated by received voltage change) is analyzed by, e.g., the processing unit 28 to determine the strain on the string 14. This strain information is further analyzed to measure various forces or parameters downhole, such as WOB, compressive forces, bending forces and torque.

The systems and methods described herein provide various advantages over prior art techniques. For example, thin film strain gauges deposited on a chassis as described herein allow for smaller sensor assemblies and greater temperature ranges than prior art glued strain gauges. In addition, chassis design and configuration is effective at transmitting strain and can also amplify strain detected by strain gauges deposited thereon. Furthermore, the assemblies described herein allow for relatively simple installation and allow for replacement of sensors within requiring re-adhesion or deposition of strain gauges to a drill string.

Generally, some of the teachings herein are reduced to an algorithm that is stored on machine-readable media. The algorithm is implemented by the computer processing system and provides operators with desired output.

In support of the teachings herein, various analysis components may be used, including digital and/or analog systems. The digital and/or analog systems may be included, for example, in the downhole electronics unit 42 or the processing unit 28. The systems may include components such as a processor, analog to digital converter, digital to analog converter, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs, USB flash drives, removable storage devices), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus for measuring strain on a downhole carrier, comprising:
    a replaceable strain sensitive chassis configured to be removably attached to a surface of the carrier, the carrier made from a material having a first coefficient of expansion, the chassis configured to be subject to a strain corresponding to a strain on the carrier, the chassis having a second coefficient of expansion that is within a range of the first coefficient of expansion so that the chassis and the carrier experience a proportional amount of strain; and
    at least one strain gauge configured to estimate a strain of the carrier, the at least one strain gauge including at least one thin film conductor sputtered onto a surface of an insulating layer, the insulating layer being deposited onto a surface of the chassis, the at least one thin film conductor being a single layer of a metallic material.

2. The apparatus of claim 1, further comprising a controller electrically connected to the conductor and configured to measure at least one force on the downhole carrier based on one or more measurements from the at least one strain gauge.

3. The apparatus of claim 1, wherein the second coefficient of expansion is at least substantially the same as the first coefficient of expansion of the carrier so that the chassis and the carrier experience at least substantially the same strain.

4. The apparatus of claim 1, wherein the insulating layer is a thin film insulating layer sputtered onto the chassis.

5. The apparatus of claim 1, wherein the at least one strain gauge is disposed as part of a Wheatstone bridge circuit.

6. The apparatus of claim 5, wherein the at least one strain gauge is a plurality of strain gauges electrically connected to one another as part of the Wheatstone bridge circuit.

7. The apparatus of claim 1, wherein the at least one strain gauge includes a plurality of strain gauges mounted on the chassis.

8. The apparatus of claim 1, wherein the chassis is fixedly mounted by at least one of a weld, an adhesive and a mechanical fastener.

9. The apparatus of claim 1, wherein the at least one strain gauge includes a protective layer disposed on the thin film conductor.

10. A strain sensing apparatus comprising:
    a drill string configured to be disposed in a borehole in an earth formation, at least part of the drill string made from a material having a first coefficient of expansion;
    a replaceable strain sensitive chassis configured to be removably attached to a surface of the drill string, the chassis having a second coefficient of expansion that is within a range of the first coefficient of expansion so that the chassis experiences a strain that is proportional to a strain on the drill string at a location of the chassis; and at least one strain gauge including at least one thin film conductor sputtered onto a surface of an insulating layer, the insulating layer being deposited onto a surface of the chassis, the at least one thin film conductor being a single layer of a metallic material.

11. The apparatus of claim 10, further comprising a controller electrically connected to the conductor and configured to measure at least one force on the drill string based on one or more measurements from the at least one strain gauge.

12. The apparatus of claim 10, wherein the insulating layer is a thin film insulating layer sputtered onto the chassis.

13. The apparatus of claim 10, wherein the at least one strain gauge is disposed as part of a Wheatstone bridge circuit.

14. The apparatus of claim 10, wherein the first coefficient of expansion is at least substantially the same as the second coefficient of expansion so that the chassis and the drill string experience at least substantially the same strain.

15. The apparatus of claim 10, wherein the chassis is fixedly mounted by a mechanical fastener.

16. A method of manufacturing a sensor for measuring strain on a downhole carrier, comprising:

depositing a thin film layer of an electrically insulating material onto a replaceable chassis, the chassis made from a material having a coefficient of expansion that is within a range of a coefficient of expansion of the carrier and configured to be subject to a strain that is proportional to a strain on the carrier at a location of the chassis;

sputtering a single thin film layer of a metallic electrical conductor on the thin film insulating layer to form a strain gauge; and removably attaching the chassis on a surface of the carrier.

17. The method of claim 16, wherein the thin film insulating layer is deposited by at least one of sputtering, evaporation, chemical vapor deposition and laser deposition.

18. The method of claim 16, further comprising orienting an axis of the strain gauge to an orientation selected from:

at least substantially parallel to an axis of the carrier for measurement of axial strain;

at least substantially perpendicular to the axis of the carrier for measurement of bending strain; and at an approximate 45 degree angle relative to the axis of the carrier for measurement of torsional strain.

* * * * *